Patented Apr. 1, 1941

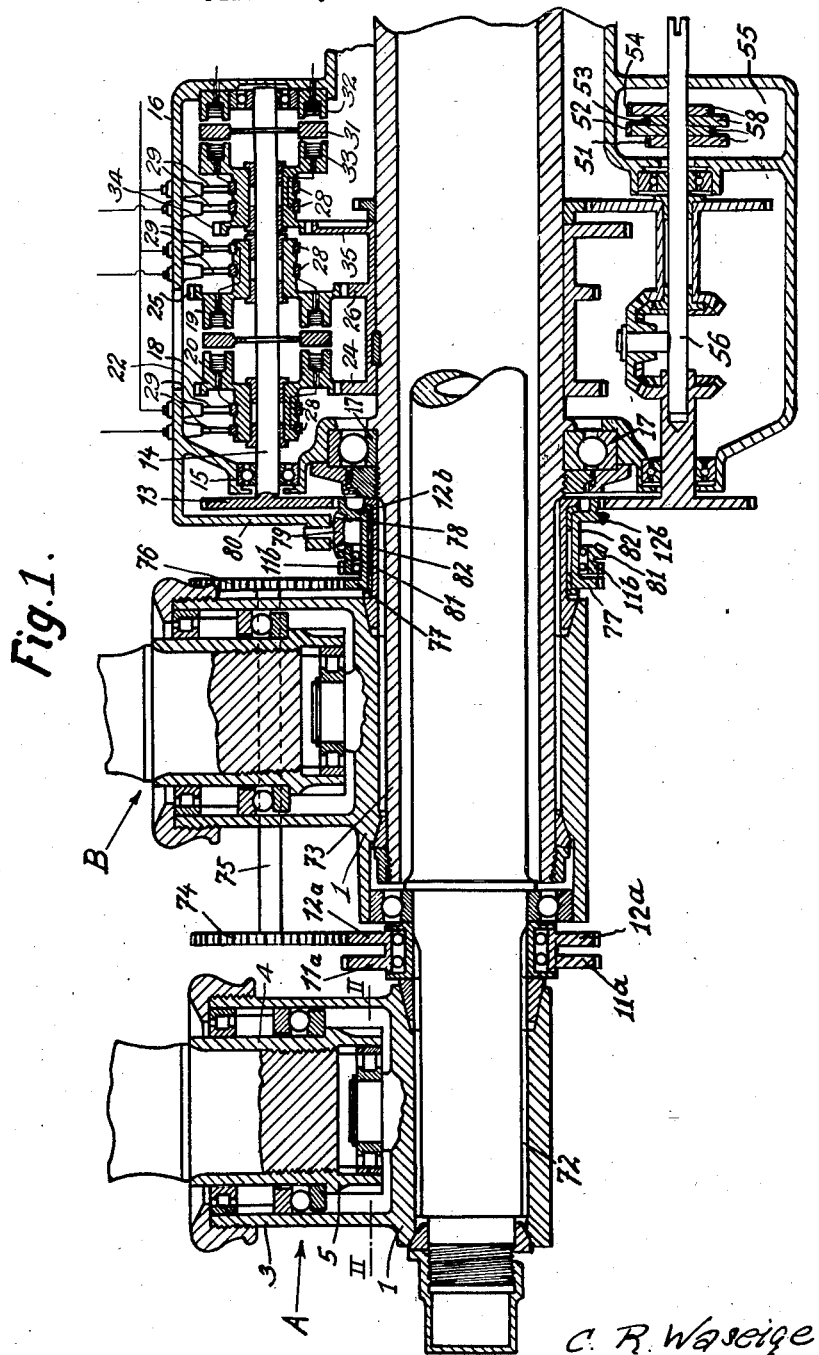

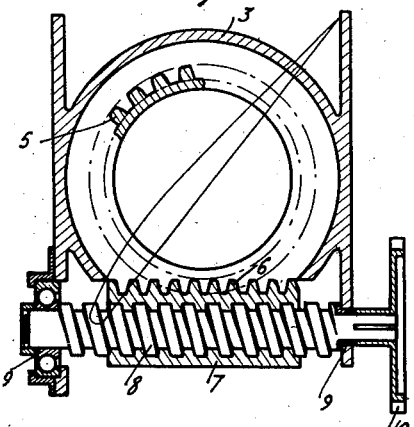
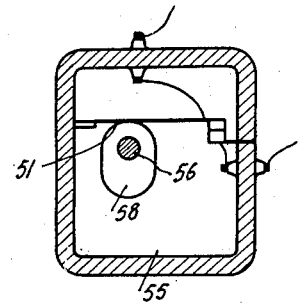
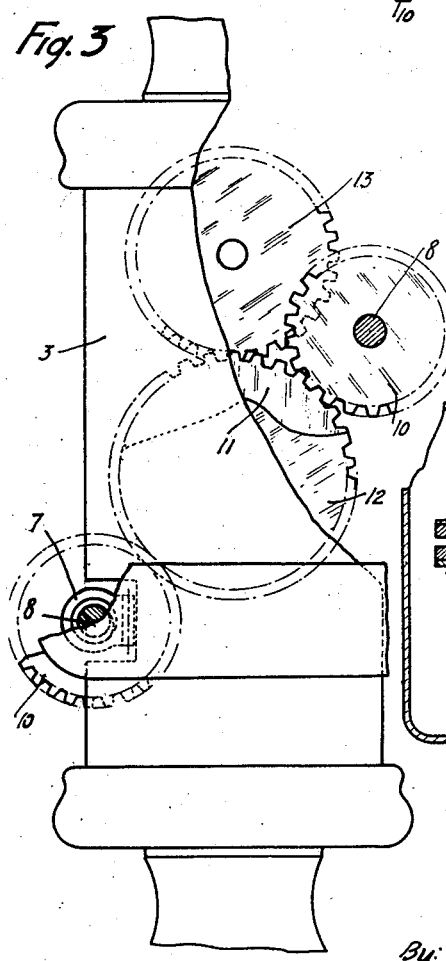
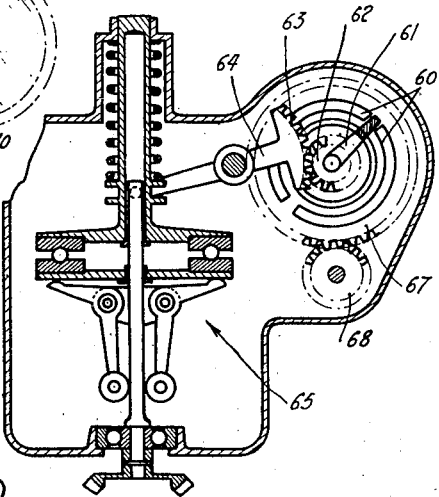

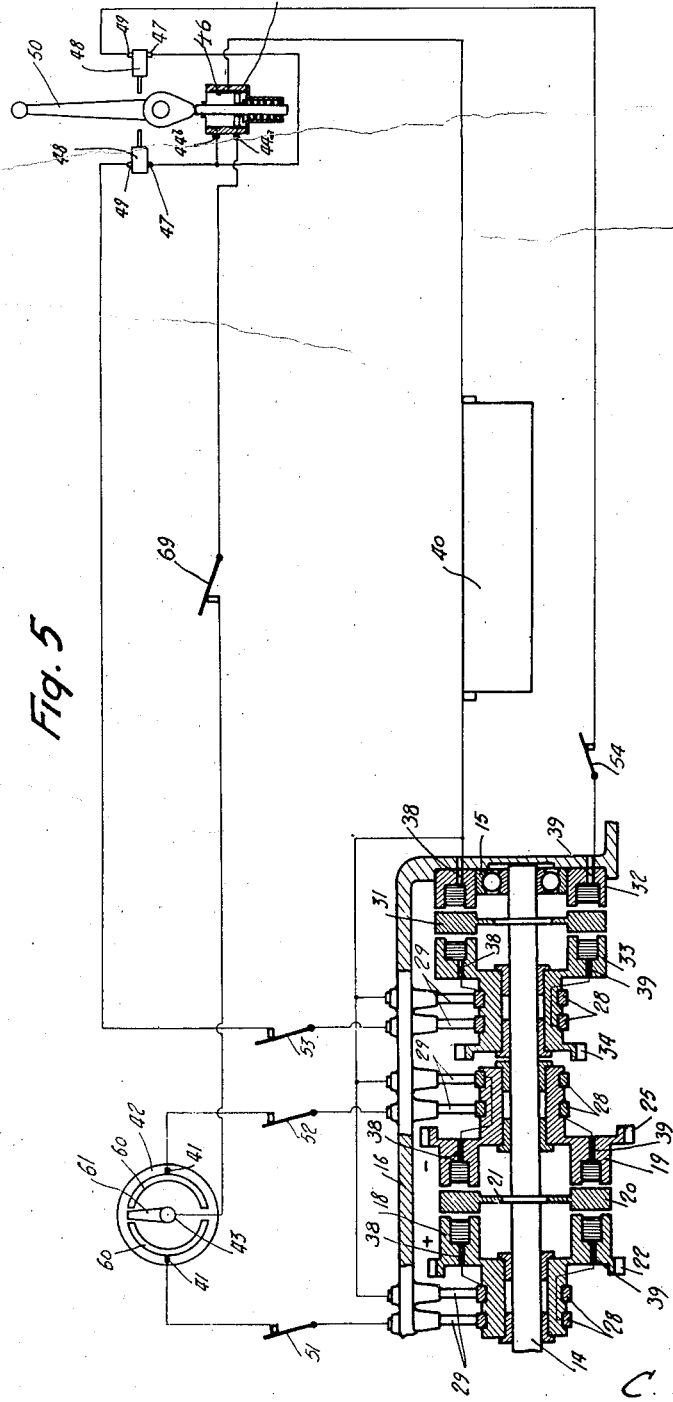

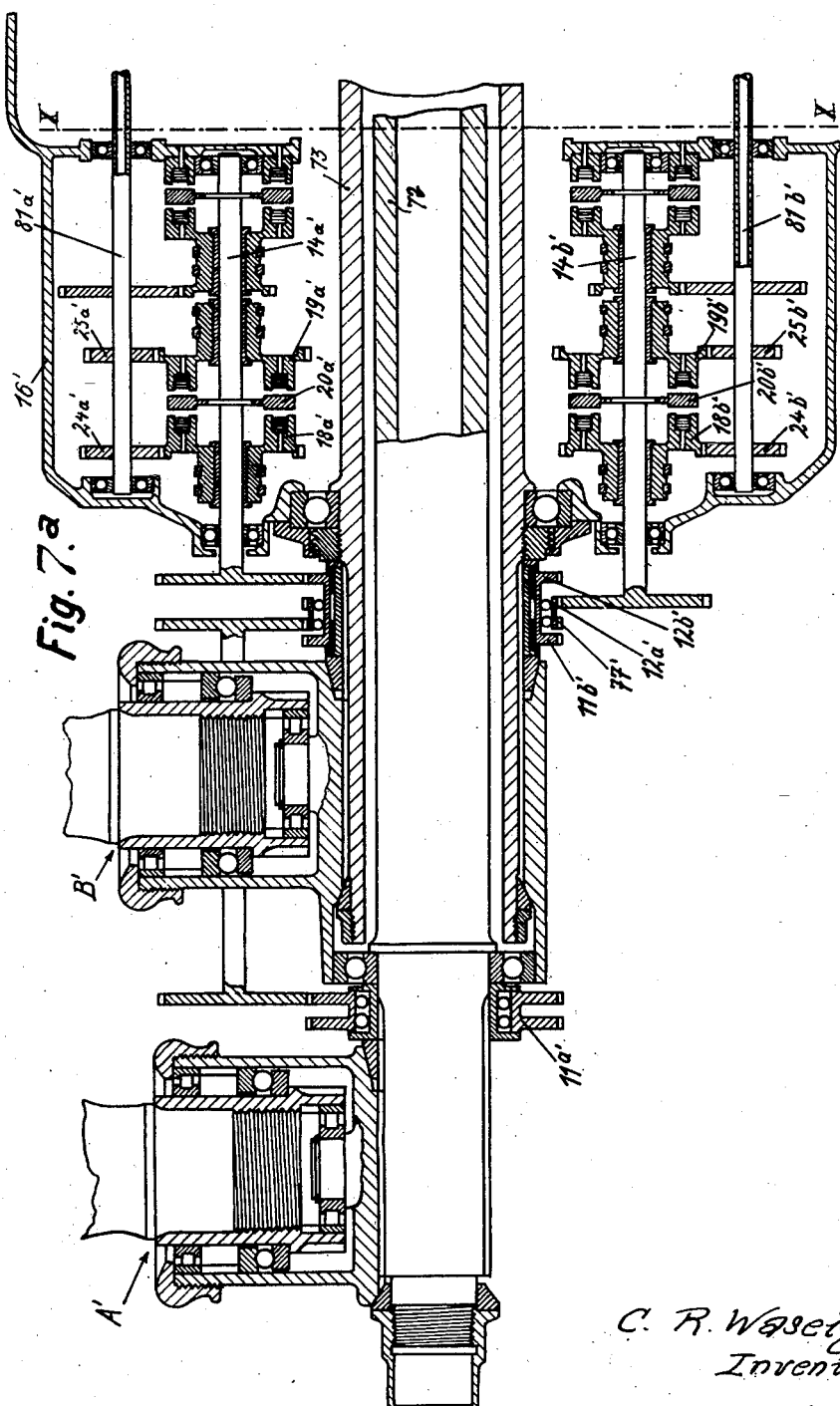

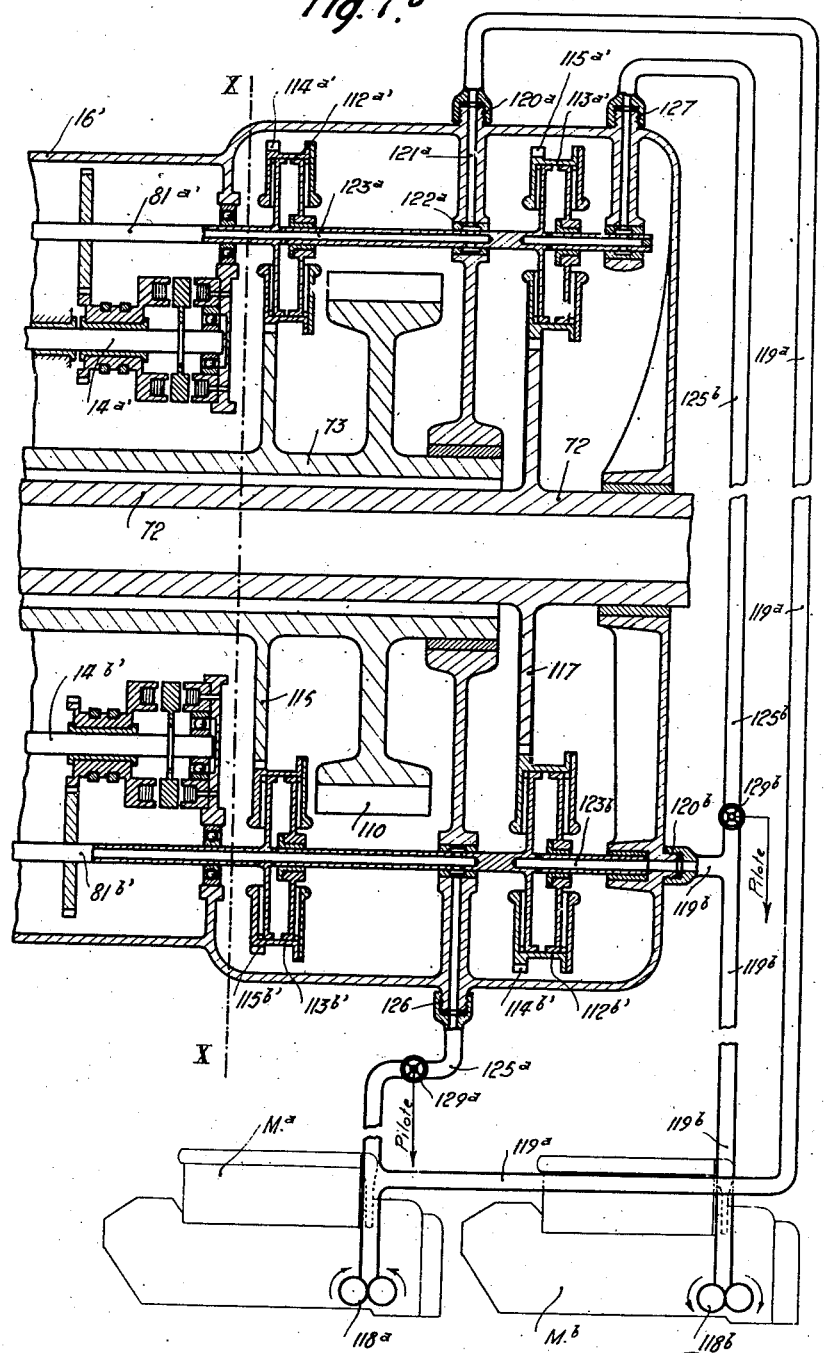

2,236,841

UNITED STATES PATENT OFFICE 2,236,841

VARIABLE PITCH AERIAL PROPELLER

Charles Raymond Waseige, Rueil, France

Application July 27, 1938, Serial No. 221,595
In France July 30, 1937

9 Claims.  (Cl. 170—163)

The present invention relates to variable pitch aerial propellers which can be utilized on land, sea-going or aerial vehicles. In this kind of propeller the pitch varying mechanism often comprises a gear wheel, a sleeve or other member which is arranged coaxially with respect to the propeller shaft and drives members or groups of members distributed over the hub which are equal in number to the blades of the propeller and which are respectively associated with the various blades and cause each of same to move about its own axis, said member which is coaxial with the propeller shaft being itself connected through a transmission to a source of power formed by the actual crankshaft of the engine or by an auxiliary electric or other motor.

The primary object of the invention is to provide for the variation of pitch of two coaxial propellers respectively mounted on two shafts which are arranged one inside the other and are driven in the same direction or in opposite directions by the same engine or by two different engines. For this purpose, the coaxial member of foremost one propeller is driven through the intermediary of an epicyclic transmission having planet gears which are compelled to rotate in unison with each other and are loosely mounted on the propeller fixed on the outer shaft, said planet gears meshing respectively with sun wheels which are coaxial with the propellers and are arranged on either side of said propeller carried by the outer shaft, the sun wheel located between the two propellers being compelled to rotate said coaxial member and the other being loose on the outer shaft and driven by the pitch varying mechanism.

Said sun wheel, which is loosely mounted on the outer shaft, can be actuated by any means, advantageously in the manner described above in the case of a single propeller. If the two shafts are invariably connected to each other, for example driven by the same engine, one and the same mechanism may be provided for actuating the two coaxial members carried by the outer shaft; in the case of independent shafts which are driven for example by two different engines, two separate control mechanisms will be provided.

By way of non-limitative examples, a plurality of embodiments of the invention have been shown in the accompanying drawings, said embodiments having the above mentioned features and furthermore offering certain other pecularities which also form detail objects of the invention.

In said drawings:

Fig. 1 is a longitudinal vertical section through the axis of the propeller shafts of an embodiment of the invention in the case of two propeller shafts invariably connected to each other and driven for example by the same engine;

Fig. 2 is a section along the line II—II of Fig. 1;

Fig. 3 is an end view of the propeller hub;

Fig. 4 is a detailed sectional view of the cam operated switches in the chamber 55;

Fig. 5 is a diagram of the electric controls;

Fig. 6 is a sectional view of an adjustable device for automatically controlling the pitch variation; and Figs. 7a and 7b are two parts to be joined to each other along the line X—X, of a similar view to that of Fig. 1, which shows a modification of the embodiment of Fig. 1 in the case in which the shafts of the two coaxial propellers are independent of each other and are driven by separate engines. In Fig. 7b there have furthermore been shown diagrammatically the driving engines and also the oil supply pipes for the clutches of the pitch varying mechanisms.

The embodiment illustrated in Fig. 1 relates to the case of two propellers A, B mounted one behind the other on two concentric shafts 12, 13, rotating in opposite directions to each other at the same speed or at any speeds but which are in a constant ratio with each other; this is the case for example of two propeller shafts driven by the same engine. In the embodiment shown, each propeller A, B is provided, for varying the pitch of the blades, with a mechanism of the type illustrated in Fig. 2.

Each propeller hub 1 which is fixed on the associated propeller shaft 12, 13 has its length reduced substantially to the diameter of the cases 3 of the blade roots 4. Each blade root 4 carries at its base a spur gear 5 meshing with a rack 6 carried by an internally screw-threaded and non-rotatable sleeve 7 screw-threaded on a screw 8 having its axis parallel with the propeller shafts and supported by bearings 9 on the case 3; said screw abuts endwise against its two bearings and has an extension outside the case 3 on which is fixed a gear 10: These members 5 to 10 as a whole form a group, the effect of which, when it becomes operative, is to move the corresponding blade about its own axis; each hub 1 supports a number of similar groups which are distributed near the various blades and are equal in number to that of the blades. The various gears 10 carried by the hub of the front propeller A mesh with a gear 11a loosely mounted on the propeller shaft 12 and which consequently forms a driving member which is common to these various groups.

Similarly the hub 1 of the rear propeller B is provided with groups of members similar to said groups of members 5 to 10 on the hub of the propeller A and the various gears 10 of said groups carried by the propeller B are all in mesh with a gear 11b loose on the outer propeller shaft 73. This gear 11b is operatively connected to the gear 11a through the following gearing.

Gear 11a is secured to a spur gear 12a in mesh with a planet gear 74 keyed on a shaft 75 parallel with the propeller shafts and rotatably journaled in the hub of the propeller B; on said shaft 75 is keyed behind the propeller B another planet gear 76 meshing with a spur gear 77 loosely carried by the outer shaft 73 and secured by a connecting sleeve 82 to a bevel gear 78 in mesh with a counter bevel pinion 79, located between the gear 78 and the propeller B and loosely journaled in a stationary bracket 80. Said bevel pinion 79 meshes with a bevel gear 81 secured to the gear 11b which is loose on said connecting sleeve 82. An epicyclic transmission is thus formed having planet gears 74, 76 which are compelled to rotate in unison with each other and are loosely mounted on the propeller B fast on the outer shaft 73 and respectively meshing with sun gears 12a, 77 which are coaxial with the propellers and are arranged on either side of said propeller B, the gear 12a located between the two propellers being secured to said coaxial member 11a and the other, 77, being loosely mounted on the outer shaft 73. The double gear 77, 78 is secured to a spur gear 12b coaxial with the propeller shafts and in mesh with a gear 13 fast on the end of a shaft 14 which is parallel with the propeller shafts and is journaled in bearings 15 of a support 16 having the shape of a case. Said support 16, in which is journaled the outer propeller shaft 73, is fixed on the supporting case of said propeller shaft. On the shaft 14 inside the case 16 are loosely mounted the winding support plates 18, 19 of two electromagnetic clutches having the same armature 20 carried between said two plates 18, 19, by a plate 21 fast on the shaft 14 and resiliently deformable transversely. The plate 18 carries a gear 22 meshing with a gear 24 fast on the outer shaft 73 and the plate 19 carries a gear 25 meshing with a gear 26 likewise fast on the outer shaft 73. Conducting rings 28 which are fixed on the plates 18, 19 and rub against brushes 29 carried by the case 16, serve for the feed and the return of the supply current for the windings of said electro-magnetic clutches. The transmission ratio of the gears 24—22 is very slightly lower than that of the gears 12—13 which is itself very slightly lower than that of the gears 26—25.

On said shaft 14 is furthermore fixed another armature 31 which is similar to the armature 20 and co-operates with two winding support plates 32 and 33, one of which, 32, is fixed to the case 16 and the other of which, 33, is loosely mounted on the shaft 14 and carries a gear 34 meshing with a gear 35 fast on the shaft 2; the supply of the winding of the plate 33 is effected by means of rings 28 and brushes 29, as for the clutches 18 and 19. The transmission ratio of the gear 35—34 is very much higher than that of the gears 24—22.

The operation is as follows:

When none of the clutches 18, 19, 32, 33 is engaged, it is obvious that the gears 10 carried by the respective hubs of the propellers drive the gears 11a, 11b at the same speed as the propellers as though they were integral with the hubs 1; as the gear ratio of the gearing 11a, 12a, 74, 75, 76, 77 is equal to 1, the gear 77, and consequently the gear 12b secured thereto, are rotated through said gearing from the gear 11a and through the gearing 81, 79, 78 from the gear 11b at the same speed as the propellers; the gear 12b thus rotates the shaft 14 at a speed which depends on the propeller's speed. On the other hand, the gears 24—22 and 26—25 respectively rotate the plates 18 and 19 at speeds, one of which is very slightly higher and the other very slightly lower than that of the shaft 14; the difference of speed between the two members 20 and 18, on the one hand, and 20 and 19 on the other hand, of each clutch is therefore very small and may be chosen by construction as small as desired. If current is passed through the winding of the plate 18, the armature 20 is attracted and the shaft 14 is compelled to rotate at the speed of the plate 18 which is slightly higher than that at which it previously rotated; it ensues that the gear 12b is rotated slightly faster than the propeller shafts. It consequently rotates both gears 11b and 11a at a faster speed and the latter rotate in turn the associated gear 10 about their own axes, thereby causing, by rotating the screw 8, a longitudinal movement of the nuts 7 and the same variation of the pitch of the blades of the two propellers A and B. By passing the current through the winding of the plate 19, the gears 11a and 12b are similarly caused to rotate slightly slower than the propeller shafts, thereby causing a variation of pitch in the opposite direction to the previous one.

When current is sent through one or other of the windings of the plates 32, 33, the variation of pitch is produced in a similar manner to that just described but at a much greater speed in order to produce a very quick reversal of the pitch, in a time of less than one second.

In the case of propellers rotating at speeds which are different but are always in the same ratio, either positive or negative according to whether the propellers are rotating in the same direction or in opposite directions, the pinion 79 is replaced by a transmission having a ratio which is equal to the ratio of the speeds, or again the epicyclic transmission is constructed in such a manner that its ratio is equal to the ratio of said speeds.

In the case of propellers rotating in the same direction at the same speed, the wheel 11b may be eliminated and the wheel 77 is this case forms the coaxial member of the propeller B.

The supply of current to the electro-magnetic clutches can be effected in the present exemplary embodiment according to the diagram of Fig. 5. In said diagram, each plate 18, 19, 32, 33 carries two terminals 38 and 39 for the input and output of the current in its winding. The various terminals 38 are connected in parallel to one of the poles of a battery of accumulators 40, through the intermediary of the rings 28 and the brushes 29 as regards the rotating plates 18, 19 and 32. The terminals 39 of the plates 18, 19 of the mechanism for the slow variation of the pitch are respectively connected to the two terminals 41 of a two-way switch 42, the common terminal 43 of which is connected to a terminal 44a of another two-way switch 45, the common terminal 46 of which is connected to the other pole of the battery 40. The other terminal 44b of the switch 45 is connected in parallel to the terminals 47 of two switches 48, the two other terminals 49 of which are respectively connected to the terminals 39 of the plates 33 and 32. The same pivoting handle 50 serves to actuate the switches 45 and 48; in the position shown, the contact exists between the terminals 46 and 44a and the switch 42 is thus connected to the battery 40; on the other hand the contact is broken between the terminals 46 and 44b. By moving the handle 50 in one direction or the other, said handle breaks the contact between the terminals 46 and 44a and makes same between the terminals 46 and 44b, thereby connecting the two switches 48 to the battery, then the handle 50 actuates the switch 48 towards which it is pushed and the current is sent into one or the other of the plates 32, 33.

Furthermore, the supply circuits of the electro-magnetic clutches each include a switch 51, 52, 53, 54, which is automatically controlled by the pitch indicator mechanism and breaks the circuit and stops the variation of the pitch or the reversal at predetermined values of the pitch. Said switches 51 to 54 are preferably grouped in the same chamber 55 (Figs. 1 and 4) through which passes the shaft 56 for actuating the pitch indicator and on which shaft are fixed four suitable cams 58. The mechanism for actuating the pitch indicator is of known type provided with a differential and will not be described herein.

The embodiment shown in the drawings furthermore includes a device for automatically actuating the switch 42 for the slow gradual variation of the pitch. For this purpose, said switch is provided with two contacts shaped like opposite segments of a circle and respectively connected to the terminals 41 on which is adapted to move a pivoting brush 61, the spindle of which carries a gear 62 meshing with a toothed quadrant 63 carried by a pivoting lever 64, which is actuated by a centrifugal device 65, such as a centrifugal governor or, preferably and as shown, an instantaneous revolution-counter. It is also possible to use a chronometric tachometer for this purpose. Said instantaneous revolution-counter being driven by the engine, moves the lever 64 in one direction or the other as soon as the speed of the engine deviates, more or less, from a predetermined value, the brush 61 moves on to one of the segments 60 and the corresponding clutch is supplied with current until the governor has returned the brush 61 to its neutral position between the two segments 60.

It will be noted that owing to the presence of the two-way switch 45, it is impossible for the automatic variation mechanism and the reversing mechanism to operate simultaneously.

The arrangement of the centrifugal masses and of the spring is effected in such a manner that for a given difference of revolutions there is always substantially the same angular displacement of the lever 64, whatever be the speed of rotation. In this manner the range of adjustment is always the same.

The segments 60 of the switch 42 are carried by an angularly movable plate which is provided with a gear 67 engaging with a driving pinion 68 connected to a handle, not shown, within reach of the pilot and the displacement of which by the latter produces a rotation of said pinion 68 and consequently an angular displacement of the segments 60, thereby modifying the neutral position of the brush 61 and consequently the engine speed which has to be maintained by the governor.

On the part of the supply circuit which is common to the clutches 18, 19 for the automatic slow variation of the pitch, between the stud 44a of the switch 45 and the pivoting brush 61, is interposed a switch 69 which is actuated by the throttle control lever, for example through the intermediary of a cam, in such a manner as only to be closed beyond a predetermined degree of opening of said lever. Any automatic variation of the pitch is thus prevented above a predetermined speed of the engine.

In order to enable the propeller to be placed in the position of least resistance to the forward movement of the vehicle, in the event of a breakdown of the driving engine, the direction of the pitch of the screw 8 for controlling the blades will be so chosen that by stopping or slowing down the shaft 14, an increase of the pitch of the blade will be obtained. In this manner, in the event of a breakdown of the engine, it will suffice to lock the shaft 14 by any means such as a brake, a dog, etc., in order to obtain the position of least resistance assuming that the movement of the vehicle causes the propeller to rotate; if the propeller cannot rotate because the engine is seized or for any other reason, a driving mechanism is added to the shaft 14, said driving mechanism being adapted to be actuated by an emergency device or by hand and being capable of rotating said shaft 14 in the reverse direction to that in which it normally rotates when the engine is rotating.

In the modified embodiment of Figs. 7a and 7b, the two coaxial propellers A' and B' have their shafts 72 and 73 driven by two separate engines Ma and Mb through the intermediary of transmission shafts and gears, only the gear 110 of which has been shown, fast on the outer shaft 73. The coaxial member 11a' of the propeller A' is actuated through the intermediary of a similar epicyclic transmission to that of the embodiment of Fig. 1 save that the sun gear 11' which is located behind the propeller B' fast on the outer shaft is in this case interposed between the coaxial member 11b' of the propeller B' and the gear 12b' driving said member 11b'; the essential difference between the embodiment of Fig. 1 and that of Figs. 7a and 7b is that the gear 11' is not driven by the gear 12b', as is the gear 11 by the gear 12b (Fig. 1) but is independent and is driven by a gear 12a' which is integral with the gear 11a' in the present example, and that the gears 12a' 12b' mesh respectively with gears 13a', 13b' which are driven by corresponding auxiliary shafts 14a', 14b', said two shafts each carrying clutches which are respectively provided with the parts 18a', 19a', 20a', and the parts 18b', 19b', 20b' and which are similar to the clutches 18, 19, 20, of the embodiments of Fig. 1. The blade control mechanisms for the two propellers are thus independent of each other. In the case of automatic control of the pitch variation by means of a centrifugal device which is adapted to keep constant the speed of the engine driving the propeller, each control mechanism is provided with its own centrifugal device; if it is desired to make the engines rotate at the same speed, the two centrifugal devices are synchronized by known means.

On the other hand, the clutch members 10a', 19a', 18b', 19b' which are loosely mounted on the corresponding auxiliary shaft 14a', 14b', are respectively driven by gears 24a', 25a', and 24b', 25b' which are mounted on counter shafts 81a', 81b' carried by the case 16'. Said shafts 81a', 81b' are respectively driven in the following manner (Fig. 7b) by the engines Ma and Mb. Each of them in this case carries two clutches which are designated by 112a' and 113a' for the shaft 81a', and by 112b' and 113b' for the shaft 81b'; said clutches are in this case hydraulic clutches to which oil under pressure is supplied by means which will be described hereinafter. To the driving element of each clutch is secured a gear designated by 114a', 115a' for the gears 112a' and 113a', by 114b', 115b' for the gears 112b' and 113b'. The gears 114a' and 115b' mesh with a common gear 116 fast on the outer shaft 73 whereas the gears 115a' and 114b' mesh with a gear 117 fast on the part of the inner shaft 72 which projects beyond the end of the shaft 73. It will therefore be seen that two transmissions are thus formed which connect the clutch carrier shaft of the pitch varying mechanism of one propeller to one of the propeller shafts and that of the other propeller to the other propeller shaft.

Two separate oil force pumps 118a and 118b, one of which, 118a, is actuated by the engine Ma, and the other 118b, by the engine Mb, are shown in the drawings as being the actual lubricating pumps of said engines. The pump 118a is connected by a pipe 119a to a union 120a whence a pipe 121a extends to a bearing 122a of the shaft 81a' which is provided opposite said bearing with holes which open into an axial bore 123a of said shaft, said bore communicating with the inside of the clutch 112a'; the pump 118b is similarly connected by the pipe 119b, the union 120b, and the pipe 123b to the clutch 112b' on the shaft 81b'. A pipe 125a in parallel with the pipe 119a connects the pump 118a to a union 126 whence pipes similar to the pipes 121a and 123a extend to the clutch 113b'; similarly, a pipe 125b in parallel with the pipe 119b connects the pump 118b to a union 127 whence pipes extend to the clutch 113a'. Two cocks 129a and 129b or like members are arranged respectively on the pipe 125a and on the pipe 125b.

It is obvious that when the cock 129a is closed, the pump 118a is only connected to the clutch 112a' of the pitch varying mechanism of the propeller driven by the engine Ma which actuates the pump 118a; similarly, when the cock 129b is closed, the pump 118b is only connected to the clutch 112b' of the pitch varying mechanism of the propeller driven by the engine Mb which actuates the pump 118b. Said clutches 112a' and 112b' are thus held in engagement by the pressure of the oil forced up by the pumps 118a and 118b so that the shafts 81a' and 81b' are respectively rotated by the shafts 73 and 72 and each pitch varying mechanism is thus in the operative condition. The clutches 113a' and 113b' do not receive any oil under pressure and are disengaged.

If any one of the engines stops, the engine Ma for example, the corresponding pump 118a also stops and the clutch 114a' is released, whereby the shaft 81a' is no longer driven by the shaft 73 of the corresponding propeller, but if the cock 129b is then opened, oil under pressure is forced into the clutch 113a' by the pump 118b which is driven by the other engine that continues to rotate, thereby securing the shaft 81a' to the gear 115a'; the shaft 81a' is then driven by the propeller shaft 72 through the intermediary of said gear 115a' and of the gear 117 so that the pitch varying mechanism of the propeller of the broken down engine can operate, at any rate in order to bring the blades into the position of least resistance to the forward movement of the vehicle even if the propeller shaft is locked.

It is obvious that the operation of the device is similar when it is the engine Mb that stops, the opening of the cock 129a re-establishing the possibility of operation of the pitch varying mechanism of the propeller driven by the engine Mb.

It is obvious that neither of the cocks 129a, 129b must be open when the two engines are rotating normally. In order to prevent any mistaken manipulation in the case in which each cock is operable by a manual control which is available to the pilot, it is advisable that there should exist a device for locking the cock or its control in the closed position, which device is made responsive to the operation of the engine, for example by means of a movable member which is held in the position corresponding to the locking of the cock, against the action of a spring, by a force produced by the rotation of the engine or again by an electric current which only circulates when the ignition circuit of the engine is closed.

Instead of the manual control or in addition to same, each cock may be automatically controlled through the intermediary for example of a similar device to the one described above for actuating the locking mechanism.

It will be noted that the above described hydraulic clutches could be electromagnetic or centrifugal clutches. Similarly the oil under pressure will preferably be conveyed to the clutches by using the hollow driving shafts of the propellers as conduits.

It will be noted that the use of an intermediate shaft such as 81a' may also be applied in the case of Fig. 1, and that it offers in particular the advantage of eliminating the large diameter gears 24, 25, 34 (Fig. 1) which it enables to be replaced by much smaller gears such as the gears 24a', 25a', 34a' in Fig. 7b; such an arrangement furthermore and particularly offers this advantage of enabling the movement take-off to be effected at any point and the auxiliary shafts to be arranged in any manner relatively to the driving shafts of the propeller.

In all cases, the case 16 may form, with the auxiliary shaft or shafts, with or without a counter-shaft an autonomous assembly which may be mounted as a unit on an existing engine or in any other appropriate spot in an aircraft.

Of course the invention is in no way limited to the constructional details illustrated and described which have only been given by way of example. Thus, in particular, without exceeding the scope of the invention; it is possible to substitute mechanically, pneumatically or hydraulically actuated clutches of another type for the electromagnetic clutches: similarly the propeller need not have any reversing mechanism, the mechanism carried by the hub for driving each blade may be different from the one described, the movement take-off for driving the shafts 81a', 81b' may be effected at any point of the engine or of the transmission between the engine and the propeller.

What I claim is:

1. A pitch varying mechanism for propelling means including two aerial propellers with variable pitch coaxially arranged one behind the other, each of which includes a hub and propeller blades rotatably carried by said hub and two concentric inner and outer propeller shafts respectively carrying said propellers, a transmission member associated with the propeller carried by the inner shaft and arranged between said two propellers and coaxially thereto a plurality of motion transmitting contrivances carried by the hub of the propeller fast on the inner shaft and respectively connecting said transmission member to the various blades of this propeller and adapted to transform a motion of the transmission member relatively to the propeller shaft into a pitch varying motion of the blades, an epicyclic transmission including planet gears carried by the propeller fast on the outer shaft and compelled to rotate in unison with each other and sun wheels arranged on either side of and coaxially to said propeller fast on the outer shaft one between the two propellers and the other on the opposite side of said propeller on the outer shaft, the sun wheel located between the two propellers being connected to said transmission member so that an angular motion of said sun wheel relatively to the inner shaft will cause a motion of said transmission member relatively to the same shaft, separate engines for rotating separately said propeller shafts, a motion transmitting means arranged on the same side of the propeller on the outer shaft as the sun wheel around said shaft, coaxially therewith and movable relatively to said shaft, a plurality of motion transmitting contrivances carried by the propeller fast on the outer shaft and respectively connecting said motion transmitting means to the various blades of the propeller on the outer shaft to transform a motion of said means relatively to the outer shaft into a pitch varying motion of the blades, and separate actuating mechanisms for respectively rotating said other sun wheel and the motion transmitting means.

2. A pitch varying mechanism as in claim 1, said actuating mechanisms being respectively drivable from said separate engines.

3. A pitch varying mechanism as in claim 1, said actuating mechanisms being each drivable from each of said separate engines.

4. A pitch varying mechanism as in claim 1, wherein each of said separate actuating mechanisms includes a countershaft and two gear transmissions between said countershaft and said engines, respectively, each of said gear transmissions including a clutch, and control means for said clutches.

5. A pitch varying mechanism as in claim 1, wherein each of said separate actuating mechanisms includes a countershaft and two gear transmissions between said countershaft and said engines, respectively, each of said gear transmission including a clutch, and control means for said clutches, the control means of the clutch which forms part of the transmission between the countershaft and the engine other than the engine driving the propeller associated with the actuating mechanism of which said clutch is a part comprising a movable member, means urging said member in one direction, and antagonistic means urging said member in the opposite direction with a force which depends on the running of the engine driving the propeller associated with the actuating mechanism of which said clutch is a part, in such a manner that said clutch will engage automatically upon stopping of said last named engine.

6. A pitch varying mechanism as in claim 1, wherein each of said separate actuating mechanisms includes a countershaft and two gear transmissions between said countershaft and said engines, respectively, each of said gear transmission including a clutch and control means for said clutches, the control means of the clutch which is part of the transmission between the countershaft and the engine driving the propeller associated with the actuating mechanism of which said clutch is a part, comprising a device driven by said engine and thereby energised, said device cooperating with the clutch in such a manner as to hold the clutch in engagement when energised and release said clutch when deenergised as on stopping of said engine.

7. A pitch varying mechanism as in claim 1, wherein each of said separate actuating mechanisms includes a countershaft and two gear transmissions between said countershaft and said engines, respectively, each of said gear transmissions including a clutch and control means for said clutches, the control means of the clutch which forms part of the transmission between the countershaft and the engine other than the engine driving the propeller associated with the actuating mechanism of which said clutch is a part including a movable member manually operable by the pilot.

8. A pitch varying mechanism as in claim 1 wherein each of said separate actuating mechanisms includes a countershaft and two gear transmissions between said countershaft and said engines, respectively, each of said gear transmissions including an hydraulic clutch, separate pumps respectively driven by the engines, separate pipe means respectively connecting said pumps to said clutches, and valve-means in the pipe means leading to the clutch of the gear transmission between said countershaft and the engine other than that driving the propeller associated with the actuating mechanism of which said clutch is a part.

9. A pitch varying mechanism as in claim 1, wherein each of said separate actuating mechanisms includes a countershaft and two gear transmissions between said countershaft and said engines, respectively, each of said gear transmissions including an hydraulic clutch, separate pumps respectively driven by the engines, separate pipe means respectively connecting said pumps to said clutches, valve means in the pipe means leading to the clutch of the gear transmission between said countershaft and the engine other than that driving the propeller associated with the actuating mechanism of which said clutch is a part, and control means for said valve means, said control means including a member adapted to hold said valve means in a closed position and release same, and means energisable in dependence on the running of said engine and adapted to operate said member.

CHARLES RAYMOND WASEIGE.